H. B. BEACH.
Ice-Pitcher.
No. 8,444. Reissued Oct. 8, 1878.
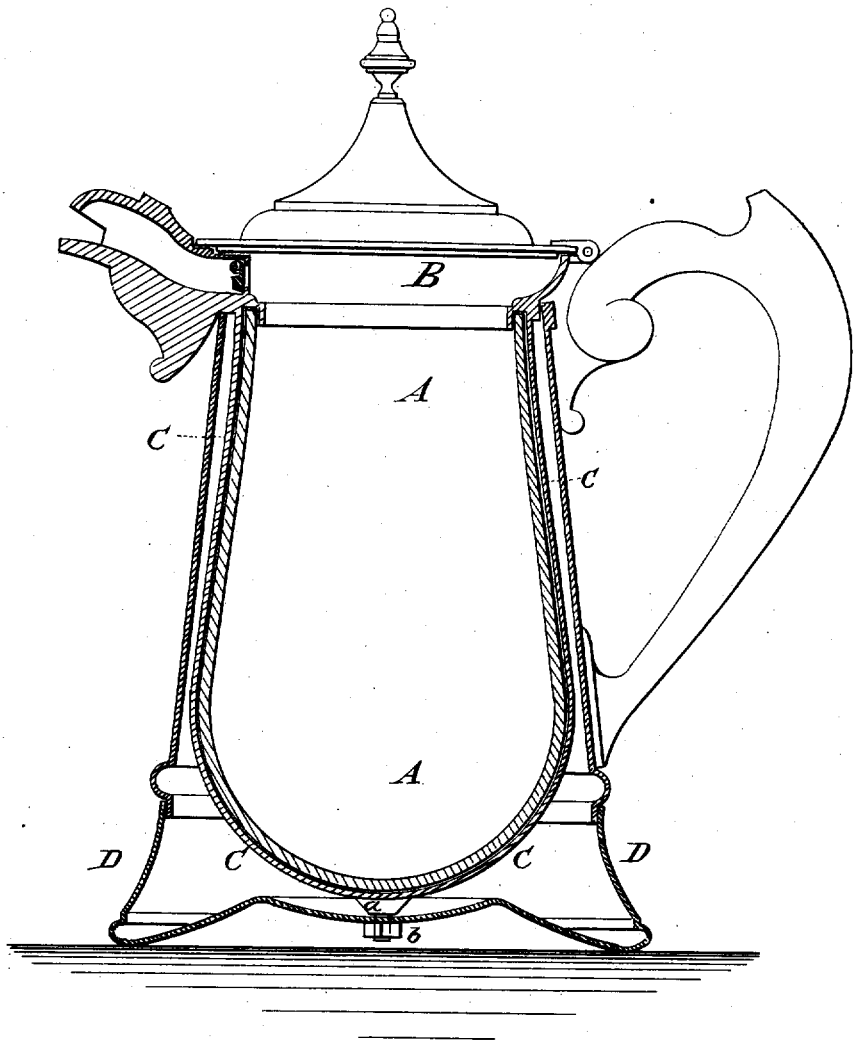
WITNESSES:
Chas. Nida
C. Sedgwick
INVENTOR:
H. B. Beach
BY Munn & Co
ATTORNEYS.
N. PETERS, PHOTO-LITHOGRAPHER, WASHINGTON, D. C.

UNITED STATES PATENT OFFICE.

HENRY B. BEACH, OF WEST MERIDEN, CONNECTICUT.

IMPROVEMENT IN ICE-PITCHERS.

Specification forming part of Letters Patent No. 202,980, dated April 30, 1878; Reissue No. 8,444, dated October 8, 1878; application filed August 9, 1878.

*To all whom it may concern:*

Be it known that I, HENRY B. BEACH, of West Meriden, in the county of New Haven and State of Connecticut, have invented a new and Improved Ice-Pitcher, of which the following is a specification:

The accompanying drawing represents a vertical central section of my improved ice-pitcher.

The object of this invention is to furnish an improved ice-pitcher of that class having an interior lining or bowl of china, glass, or similar material, said lining being so strengthened that it is not liable to be cracked by the dropping of lumps of ice into the pitcher, nor broken on dropping the pitcher. The lining is made perfectly plain without exit-holes or a spout, and therefore less expensive than the old style of linings, and stronger, so as to resist wear better in the use of the pitcher.

The invention will first be described in connection with the drawing, and then pointed out in the claims.

Referring to the drawing, A represents the interior lining or bowl of my improved ice-pitcher, which lining is made of china, glass, or other suitable non-corrosive material, and secured tightly to an annular top rim, B, that is provided with a valved or other spout and lid.

The top rim may be spun or otherwise attached to the bowl with or without cement or packing.

When the bowl is made of china it may be glazed at the outside or not, as desired, it being strengthened by an outer metallic layer or cover, C, that protects the bowl against being cracked by the ice from the inside, or broken on being dropped. The metallic layer or covering is tightly spun over the bowl, with or without the use of cement, according as a glazed or unglazed outer surface of the bowl is used.

The tightly-fitting metallic covering C adds to the strength of the inside lining, and renders the same almost indestructible to the common agencies which have heretofore caused such annoyance in the use of the porcelain or glass lined ice-pitchers.

To the bottom of the metallic covering of the bowl is soldered a downward-projecting center-screw, *a*, that passes through a central perforation of the base D of the pitcher, and is firmly secured thereto by a screw-nut, *b*. The bolt and nut connection draws the top rim B tightly down on the upper edge of the body of the pitcher and holds the bowl firmly in position inside of the body.

An ice-pitcher of superior strength is furnished, that is not liable to sweating, as the common ice-pitchers, on account of the strengthening layer of metal, which does not admit of a great difference of temperature between the interior and exterior walls of the pitcher, while furnishing with the body of the pitcher the same non-conducting air-space around the bowl.

The top rim B is jointed to the upper end of the bowl and provided with a valved spout above the bowl, so as to admit the employment of a plain bowl without any perforations or a spout to shed the water. This renders the lining less expensive and avoids its cracking or breaking at the perforated part, which is the weakest part of the bowl.

By the arrangement of an annular top rim with spout above the bowl, the water is shed more easily from the pitcher, and also a better closing valve furnished than when a bowl with holes or spout is used. The top rim and spout also dispense with the collection of water at the interior of spout and outside of pitcher, which water gets thereby warm, and is shed when the pitcher is next used.

The spout of the top rim is so constructed that any water that is not poured out is returned to the interior of pitcher, as will be readily seen from the drawing. The essential advantages of the top rim, however, consist in the employment of a cheaper and stronger bowl and in the superior shedding of the water over the rim and through the spout.

I am aware that a spun interior lining for pitchers and a screw-bolt with nut for connecting the lining with the body are not new, as they have been used heretofore.

Having thus described my invention, I claim as new and desire to secure by Letters Patent—

1. The combination of the inner lining or bowl, the spun cover, and the body of the pitcher, the two latter connected by screw-bolt and nut, substantially as shown and described.

2. The combination of the inner lining and an annular top rim and spun cover with the body of the pitcher and with mechanism to secure the tight connection of the top rim, spun cover, and body of pitcher, substantially as described.

HENRY B. BEACH.

Witnesses:
GEORGE A. FAY,
LOVELL E. NEAL.